Patented Apr. 10, 1934

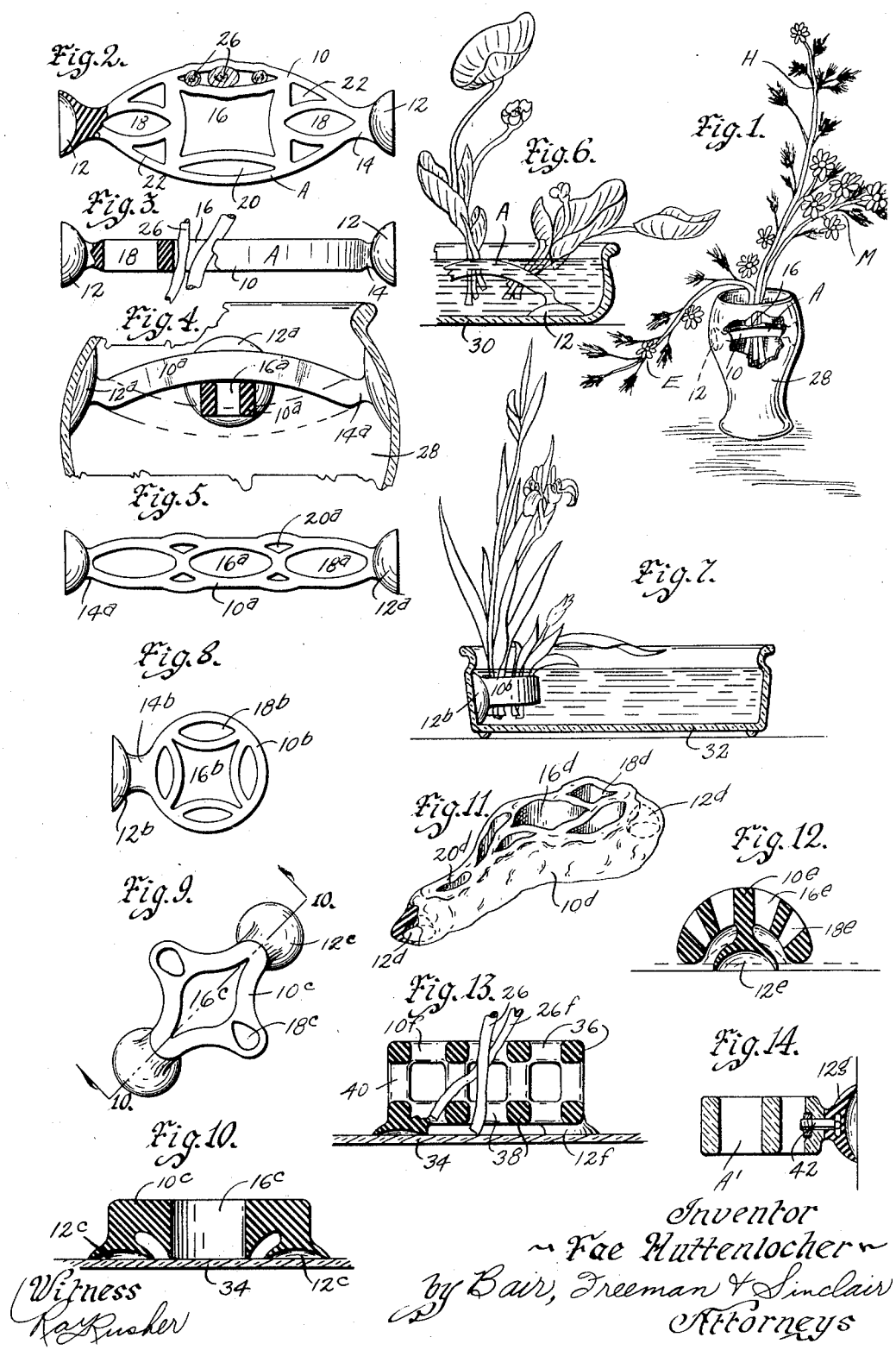

1,954,243

UNITED STATES PATENT OFFICE 1,954,243

FLOWER HOLDER FOR VASES AND THE LIKE

Fae Huttenlocher, Des Moines, Iowa

Application March 16, 1933, Serial No. 661,079

5 Claims. (Cl. 47—41)

The object of my invention is to provide a flower holder for vases and the like which is simple, durable and comparatively inexpensive to manufacture.

A further object is to provide a flower holder which can be fixed relative to the vase and in which the flower stems or the like, in turn, can be fixed so as to hold them in the positions in which they were originally arranged.

Still a further object is to provide a flower holder formed of resilient material and having openings in it to receive the flower stems so that the stems can be resiliently and frictionally gripped to retain them at any angle desired, the openings being preferably elongated to facilitate arrangement of the flower stems.

Another object is to provide means for retaining a flower holder in position relative to a vase or the like, comprising a vacuum cup formed of rubber or the like, which can be flattened against the surface of the vase and will be retained thereagainst by the surrounding air pressure.

Still another object is to provide a flower holder having an elongated body member provided with flower stem receiving openings and vacuum cups on the ends of said body member whereby the device may be buckled and interposed between the sides of a vase at any height desired therein, the vacuum cups engaging the opposite sides for effectively and permanently retaining the holder in position relative to the vase.

Another object is to provide the holder of molded rubber for instance or other resilient material so that it can be buckled and thus entry into the vase secured, the degree of buckling varying more or less depending upon the diameter of the particular part of the vase to which it is applied, this feature also permitting sufficient variation so that the holder can fit several sizes of vases.

Another object is to provide one form of the holder with a vacuum cup on the side of it so that it can be secured to one side only of a vase or bowl, this form of the invention being particularly desirable for shallow vases where it is desired to arrange a bouquet at one side only thereof.

Still a further object is to provide forms of the invention adaptable for coaction with the top surface of the bottom of a vase or tray for supporting the flowers so that they extend upwardly from such bottom.

With these and other objects in view my invention consists in the construction, arrangement and combination of the various parts of my device, whereby the objects contemplated are attained, as hereinafter more fully set forth, pointed out in my claims and illustrated in the accompanying drawing, in which:—

Figure 1 is a perspective view of a vase with one of my holders therein and a bouquet supported relative to the vase by the holder, a part of the vase being broken away to show the holder therein.

Figure 2 is an enlarged plan view of the holder shown in Figure 1, one end thereof being shown in section.

Figure 3 is a side elevation, partially in section, of the holder shown in Figure 2.

Figure 4 is a side elevation showing the holder installed in a vase and a second holder in cross section installed at right angles to the first or upper one.

Figure 5 is a plan view of a narrower form of the holder shown in Figure 2.

Figure 6 is a side elevation of the holder showing how it can be used in a shallow vase.

Figure 7 is a side elevation of a modified form of holder, especially adapted for a shallow vase or tray.

Figure 8 is a plan view of the holder shown in Figure 7.

Figure 9 is a plan view of a holder adapted for mounting on the top surface of the bottom of a vase, especially a shallow vase.

Figure 10 is a vertical sectional view on the line 10—10 of Figure 9.

Figure 11 is a perspective view of another form of holder for a shallow vase, the holder being of ornamental shape to represent a rock.

Figure 12 is a cross sectional view of another ornamental holder simulating a mushroom.

Figure 13 is a vertical sectional view through a modified form of holder having upper and lower cross bars; and Figure 14 is a sectional view of a holder made of material other than rubber and having a rubber vacuum cup secured to it.

In the proper arrangement of a bouquet to obtain artistic and pleasing effects, it is quite necessary to place the flowers in the proper position and it is also necessary that they be held in such position by some kind of a practical holder. Heretofore holders in the form of blocks of material to be set on the bottom of the vase have been employed, such holders being made of lead, glass and other solid material and having openings into which flower stems may be inserted. There is no possibility of holding the stem at the desired angle, however, unless material of some kind is placed or wedged in the openings of the holder or in the vase itself, to hold the stems in the position desired. Furthermore, holders of this character do not have any means for fixing their position relative to the vase itself and especially when the base of the vase is much larger than the holder there is a tendency for the holder to slip out of position.

It is therefore one of the primary objects of my invention to provide a holder which will both grip the flower stems and grip the vase wall, so that the stems can be held fixed relative to the wall and thus retained in the desired position.

For instance, it is quite necessary to the good arrangement of a bouquet to have one upwardly extending branch, curving outwardly and then back toward the center as indicated at "H" in Figure 1, and this represents heaven. Another branch should extend outwardly and droop such as indicated at "E", and this indicates the earth. A third branch should be the point of interest and extend upwardly, but not as high as the branch "H". This is indicated at "M" and symbolizes man.

In order to maintain the proper arrangement and balance it is quite obvious that the stems should be retained in the position desired. The bouquet shown in Figure 1 is quite simple and shows only the main structure. Other stems and flowers can be worked in harmoniously with the three main points—"H", "E" and "M".

From the foregoing, it is quite apparent that a holder which can be secured to the vase and which will grip the flower stems so as to hold them in the position in which they were originally arranged is quite desirable.

In Figures 1, 2, 3 and 4 I have shown a holder A comprising an elongated body member 10 and vacuum cups 12 on the ends thereof. A reduced neck 14 connects each vacuum cup 12 with the body member 10. Within the body member, openings, such as indicated at 16, 18, 20 and 22, are provided for receiving the flower stems, for instance as shown at 26. Due to the resiliency of the material (it preferably being made of rubber) the stems when slightly larger than the opening into which they are inserted will slightly expand the opening and the wall of the opening will resiliently grip the stem to retain it in position. A large number of stems, of course, can be placed in the opening 16 with the remaining openings 18, 20 and 22 being utilized or not as necessary for the best arrangement.

The holder A, being of resilient material, can be buckled before it is inserted into the neck of a vase 28 and it will then tend to straighten out, the cups 12 flattening out and the surrounding air pressure then tending to keep them in firm and fixed position relative to the wall of the vase. The reduced necks 14 permit considerable buckling of the body member 10 relative to the vacuum cups 12 and permit considerable angular arrangement of the cups relative to the body member so that the holder can be interposed between vase walls of various diameters and the holder will be retained in a desirable position regardless of the angle of the particular part of the wall to which the holder is applied.

If desired, two of the holders can be crossed, if they are of the type shown in Figure 5, which has a body portion somewhat narrower than the type shown in Figure 2. The body member, in Figure 5, is indicated as 10a and the openings therein as 16a and 18a.

The reduced necks 14 permitting considerable angular relationship between the cups 12 and the body portion 10, make it possible to use the holder on the bottom of a shallow vase 30, as shown in Figure 6.

I have shown a modified form of the holder in Figures 7 and 8, which comprises a body member 10b and a single vacuum cup 12b. This holder is adapted to be supported at one of its sides on the side of a shallow vase or tray 32. Openings 16b and 18b are provided for the flower stems.

In Figure 9 I have shown a holder comprising a body member 10c having openings 16c and 18c therein, the holder being adapted for placement on the top surface of the bottom 34 of a vase as shown in Figure 10. A pair of downwardly opening vacuum cups 12c are provided for retaining the holder in position relative to the bottom 34 so that it can not slip horizontally therealong and neither can it tip relative thereto.

In Figure 11 I have shown a holder 10d of ornamental shape simulating a rock or the like. It is provided with irregular openings 16d and with vacuum cups 12d which are formed in the bottom surfaces of the holder.

Figure 12 illustrates a body member 10e in the form of a mushroom, while a single vacuum cup 12e is shown, its position being within the body member 10e, it being accordingly concealed thereby. The peripheral edge of the body 10e acts as a base for the body.

In Figure 13 I have shown how the holder can be formed with upper and lower cross bars 36 and 38 respectively. These are connected by posts 40, and vacuum cups 12f are provided to retain the holder on the bowl 34 or vase. The cross bars 36 and 38 can be arranged in the form of squares and the flower stems 26 can be inserted through either aligned openings in the bars 36 and 38 or openings which are out of alinement, when it is desired to extend the stem at an angle as shown at 26f.

In Figure 14 I have shown how a holder A' may be formed of ceramic, glass or other material and secured to a vacuum cup 12g by a bolt 42 or the like. Thus it is possible to secure the holder A' to the side of a vase, or, if the cup 12g is placed on the bottom of the holder, then on the bottom of a vase.

This of course, does not provide as good a holder because the body member A' is not resilient, but nevertheless it does provide a means for fixing a holder of solid character relative to the vase.

A holder of the kind described being formed of resilient material so that it will readily hold flower stems in the position desired and having vacuum cups so that it can be secured to a vase, accomplishes the desired purpose of fixing the flower stems in the proper position and at the proper angle relative to the vase without any subsequent danger of the stems slipping relative to the holder or the holder slipping relative to the vase. With a holder of this character therefore it is readily possible to arrange a bouquet with the assurance that it will remain as arranged.

Some changes may be made in the construction and arrangement of the parts of my device without departing from the real spirit and purpose of my invention, and it is my purpose to cover by my claims, any modified forms of structure or use of mechanical equivalents, which may be reasonably included within their scope.

I claim as my invention:—

1. A flower holder for vases and the like comprising an elongated bar-like body member of resilient material, having an opening therein elongated transversely of its axis to receive and retain flower stems and the like in fixed position relative to the body member, and a vacuum cup at each end of said body member.

2. A flower holder for vases and the like comprising an elongated bar-like body member of resilient material, having a slot like opening therein to receive and retain flower stems and the like in fixed position relative to the body member, and a vacuum cup at each end of said body member, the material of said body member adjacent said vacuum cups being substantially reduced in cross sectional area to facilitate ready bending thereof.

3. A flower holder formed of rubber and comprising a bar-like body portion having an opening therein and a vacuum cup at each end thereof, said vacuum cups opening in opposite directions.

4. A flower holder formed of resilient bendable material and comprising a body portion having an opening therein and a pair of vacuum cups located at opposite ends of said body portion, said vacuum cups opening in opposite directions and away from said body portion.

5. A flower holder formed of resilient bendable material and comprising a body portion having an opening therein extending substantially vertically thereof for holding flower stems or the like, and a vacuum cup thereon opening laterally outwardly, whereby the holder may be mounted on an upright wall, as in a vase, bowl or the like, at any height therein for maintaining flowers in properly arranged position.

FAE HUTTENLOCHER.